(12) United States Patent
Walter et al.

(10) Patent No.: US 8,042,814 B2
(45) Date of Patent: Oct. 25, 2011

(54) SEAL

(75) Inventors: Wilhelm Walter, Poppenhausen (DE);
Alexander Haepp, Hofheim (DE);
Bernhard Wilm, Nuedlingen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 208 days.

(21) Appl. No.: 11/908,982

(22) PCT Filed: Mar. 9, 2006

(86) PCT No.: PCT/DE2006/000412
§ 371 (c)(1),
(2), (4) Date: Sep. 18, 2007

(87) PCT Pub. No.: WO2006/099835
PCT Pub. Date: Sep. 28, 2006

(65) Prior Publication Data
US 2008/0111317 A1    May 15, 2008

(30) Foreign Application Priority Data
Mar. 19, 2005   (DE) .......................... 10 2005 012 733

(51) Int. Cl.
*F16J 15/32*    (2006.01)
(52) U.S. Cl. ...................................... 277/552; 277/562
(58) Field of Classification Search .................. 277/349,
277/351, 423, 549, 551, 552, 562, 572, 556
See application file for complete search history.

(56) References Cited

U.S. PATENT DOCUMENTS

| | | | | |
|---|---|---|---|---|
| 2,992,027 A * | 7/1961 | Wright et al. | ................. | 277/565 |
| 3,005,648 A * | 10/1961 | Christensen | ................... | 277/560 |
| 3,955,859 A * | 5/1976 | Stella et al. | ................... | 384/215 |
| 4,399,998 A | 8/1983 | Otto | | |
| 4,531,747 A * | 7/1985 | Miura | ........................... | 277/552 |
| 4,667,968 A * | 5/1987 | Nash et al. | ..................... | 277/568 |
| 4,819,949 A * | 4/1989 | Otto | ................................ | 277/351 |
| 5,649,709 A * | 7/1997 | Munekata et al. | ............ | 277/560 |
| 6,029,980 A | 2/2000 | Downes | | |
| 6,609,716 B2 * | 8/2003 | Friend et al. | .................. | 277/550 |
| 6,669,373 B2 * | 12/2003 | Ohtsuki et al. | ............... | 384/486 |
| 7,056,028 B2 * | 6/2006 | Hosoda et al. | ............... | 384/486 |
| 7,497,630 B2 * | 3/2009 | Muramatsu et al. | .......... | 384/477 |

FOREIGN PATENT DOCUMENTS
EP    0319822 A    6/1989

* cited by examiner

*Primary Examiner* — Vishal Patel
(74) *Attorney, Agent, or Firm* — Lucas & Mercanti, LLP

(57) ABSTRACT

The seal for sealing off the bearing interior of a bearing has a first sealing lip angled outward from a base of the seal and forming a first sealing contact, and a second sealing lip angled inward from the base and forming a second sealing contact. An annular chamber is formed between the first sealing lip and the second sealing lip. The first sealing lip has at least one ventilation opening which leads into the chamber from the outside. The ventilation opening is positioned at the first sealing contact.

3 Claims, 2 Drawing Sheets

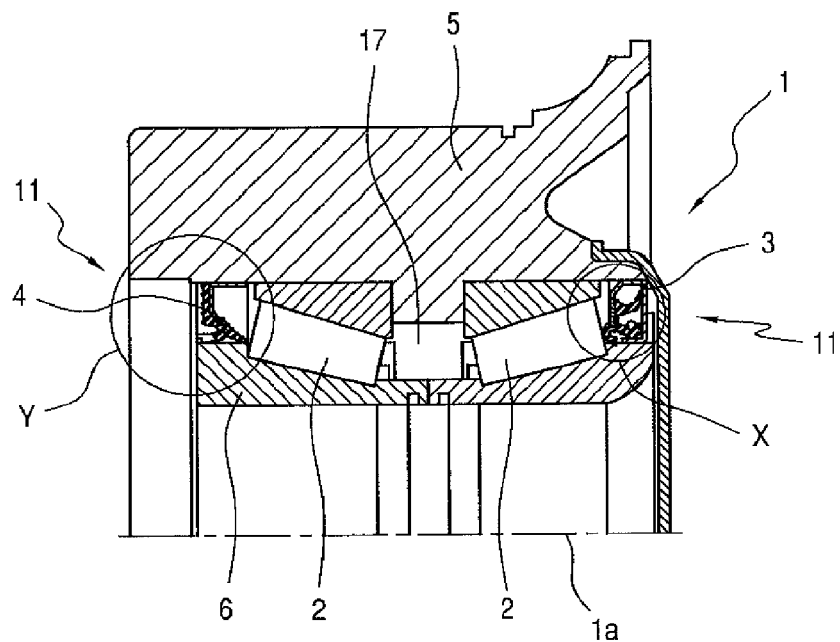
FIG. 1
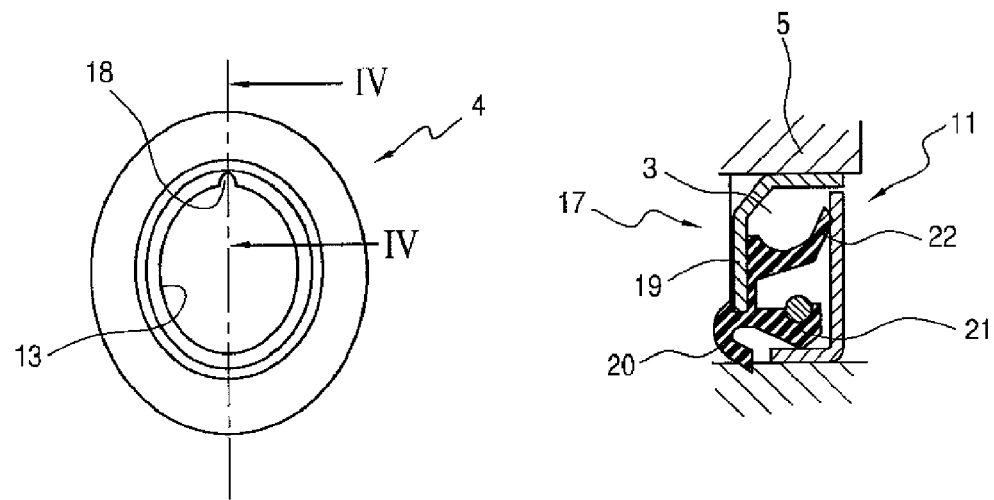
FIG. 2
FIG. 3

SEAL

FIELD OF THE INVENTION

The invention relates to a seal with two sealing lips directed away from one another for sealing off the internal space of a bearing.

BACKGROUND OF THE INVENTION

The mountings of wheels on vehicles have, as a rule, one seal subjected to mostly high load due to dirt and due to other influences of the external surroundings and, axially on the other side of the mounting, one seal subjected to less load. On account of the different loads on the seal caused by the environment, the seal subjected to higher load therefore, as a rule, as what is known as a cartridge seal, with at least two sealing lips, seals off the interior of the wheel mounting in a multiple way, leaktight, inwardly with respect to the external surroundings.

The sealing lips of the seals are prestressed elastically against a sealing surface. The sealing surfaces are cylindrical surface areas (inner cylindrical, preferably outer cylindrical), the axis of symmetry of which is the axis of rotation of the bearing. The sealing lips run on the sealing surface about the axis of symmetry in the direction of rotation in relation to the sealing surface. It is possible that the seal is fixed in relation to the surroundings and the sealing surface rotates with respect to the sealing lip or that the sealing surface is fixed in relation to the surroundings and the sealing lip runs on the sealing surface about the axis of symmetry in the circumferential direction. In both instances, friction arises during contact between the sealing surface and the contact zone of the sealing lip with the sealing surface. The intensity of the friction depends on many different factors, Mention is made here, as examples, of the relative speeds, the materials and the structures of the surfaces of the seal/frictional-surface friction partners and lubrication during frictional contact.

The prestress with which the seal is prestressed against the sealing surface has an important influence on the frictional behavior. The prestress is determined by tolerances and by the function of the sealing lip and is preselected correspondingly, but also as a function of influences, described below, which occur when the seal is in operation.

The seals, as a rule, are subjected to load due to pressure drops between the bearing interior and the external surroundings. Depending on the design of the seal and on the operating conditions, the bearing interior is loaded with underpressures or overpressures, as compared with the pressure in the external surroundings. Temperature rises, for example during driving, lead to overpressures in the inner space of the bearing. When the bearing is at a standstill, the bearing interior cools down again to the temperature of the external surroundings, underpressure occurring in the bearing interior. Both overpressures and underpressures have disadvantageous effect on the operating behavior of the mounting or of the seals and therefore have to be compensated.

The sealing lips of the seals are designed, as a rule, such that they block against pressure in the axial direction and yield in a directed way to overpressures or underpressures in the other direction. The primary task of the seals and therefore of the sealing lips is to protect the interior of the wheel mounting against influences arising from the external surroundings by sealing of the bearing interior with respect to the influences, such as dirt and water, from outside. Overpressure on the outside because of underpressure in the interior of the bearing presses the sealing lips onto the sealing surface to a greater extent and increases the sealing action, that is to say, in this case, the sealing lips also block inwardly against overpressure from outside. The underpressure in the bearing interior cannot be compensated by means of these inward-blocking sealing lips. On account of the higher pressing force on the sealing lips from outside, the above-mentioned radial prestress and, consequently, the friction between the seal and sealing surfaces increases. This results in undesirable wear and higher operating temperatures.

However, inward-blocking sealing lips compensate when there is a pressure drop from the inside outward. Overpressures from inside lift off the sealing lips in sealing contact from the sealing surfaces elastically. Overpressures in the bearing interior are thus compensated outwardly.

The bearing interior, as a rule, is greased. At high temperatures, the grease becomes liquid and possibly, during pressure compensation, escapes outward via the above-mentioned sealing lips. This may lead to a deficient lubrication of the rolling bearing. It is therefore expedient to provide seals with at least one sealing lip which holds the grease in the bearing in the event of the compensation of overpressures from the interior of the bearing outward. Sealing lips of this type block the bearing interior against the emergence of grease from the inside outward, but also, in the event of overpressures in the bearing interior, against pressure compensation from the inside outward. However, underpressure prevailing in the bearing interior can be compensated via these outward-blocking sealing lips, in that these sealing lips lift off from the sealing surface elastically on account of overpressure in the external surroundings.

As mentioned initially, the primary task of the cartridge seals is, on that side of the wheel mounting which is subjected to a high load due to environmental influences, to block the bearing interior inwardly against the influences from outside. The introduction of a device for the compensation of pressure drops from the outside inward needlessly increases the cost of the cassette seal which already has a complex construction. Therefore, it lends itself to integrate an arrangement for the compensation of underpressures in the bearing interior into the seal which is subjected to less load and therefore has a simpler design.

A seal of this type is described in U.S. Pat. No. 4,844,480. The seal of the generic type has one or more diaphragm orifices as ventilation orifices on the inward-blocking first sealing lip lying axially on the outside in the sealing arrangement. The ventilation orifices provide, in the sealing lips blocking further inward against dirt and water, an axial passage for pressure compensation into an annular prechamber of the seal. However, because of the small size of the orifices, dirt can scarcely enter the prechamber. The second seal follows the first sealing lip axially toward the bearing interior and blocks against the emergence of grease outward to the prechamber. Overpressures in the prechamber act on the second sealing lip until the latter lifts off and the underpressure in the bearing inner space is compensated.

A seal of this type is unsuitable or is suitable to only a limited extent for use on wheel mountings of vehicles, since the diaphragm orifices may become clogged with dirt during driving and the functioning of the seal therefore is adversely influenced.

SUMMARY OF THE INVENTION

The object of the invention, therefore, is to provide a seal of the generic type which is not susceptible to dirt. At the same time, the seal is to protect bearings effectively against environmental influences and at the same time generate as little friction as possible during driving.

The object is achieved by means of a seal which has the following features:

The seal is provided with at least one first sealing lip blocking inwardly against influences from outside and with at least one second sealing lip axially following an annular prechamber and blocking from the bearing interior in the direction of the prechamber.

The sealing lips are directed away from one another. For this purpose, the first sealing lip is angled outward from a base of the seal, runs from the base between the annular prechamber and the external surroundings of the seal, at least up to at least a first sealing contact, and engages over and delimits the annular prechamber with respect to the external surroundings of the seal.

The second sealing lip lies essentially axially opposite the first sealing lip at the prechamber. For this purpose, the second sealing lip is angled inward from the base of the seal in the other direction and delimits the bearing interior outwardly in the direction of the prechamber, the second sealing lip running from the base of the seal between the bearing interior and the prechamber, at least up to at least a second sealing contact.

The sealing contact is the frictional contact of the respective sealing lip with an at least linearly designed sealing surface on a component that either moves rotating in relation to the sealing lip or on which the sealing lip of the rotating seal runs. Sealing surfaces of this type are formed, for example, on rotating or stationary inner rings, wheel bolts, axle stubs or shafts or on outer rings or housings for the mounting.

The first sealing lip has at least and preferably one ventilation orifice leading from outside into the prechamber. The ventilation orifice is not a hole, delimited on all sides by the material, in the sealing lip, but, instead, a recess at the sealing edge, designed selectively as an edge or face, of the sealing lip. The sealing edge is directly in sealing contact with the component. The recess is open to the sealing surface of the component and is therefore not delimited by the material of the sealing lip in the direction of the sealing surface. As a result, the first sealing lip, otherwise bearing sealingly in a circumferentially continuous manner about the axis of rotation of the bearing, is partially interrupted at the sealing edge, in first sealing contact, by the ventilation orifice in the circumferential direction about the axis of rotation of the bearing.

By the ventilation orifice being arranged at the sealing edge of the sealing lip, the latter runs little risk or no risk at all of being clogged with dirt, since the orifice is formed in the moved part of the friction pairing. The constant elastic variations at the moving sealing edge and therefore also at the ventilation orifice give rise to a self-cleaning of the possibly clogged ventilation orifice. The dies for producing the seal preferably manufactured from elastomer can be produced in a simple way.

The sealing surface for the two sealing lips of the seal is formed, as a rule, on a cylindrical surface of the friction partner of the seal. It is also conceivable, however, that each of the seals bears separately against a sealing surface of any desired rotationally symmetrical shape. It is also conceivable that each of the sealing lips runs separately on a cylindrical sealing surface, the cylindrical sealing surfaces deviating from one another in diameter.

The sealing lips, as a rule, are radially prestressed elastically against the sealing contact and therefore against the sealing surface or at least bearing against the latter. Only thus is it ensured that the seal bears against the sealing surface without a gap even in the most unfavorable tolerance situations. On account of the low circumferential speeds, as a rule, radial shaft sealing rings are employed, the sealing lips of which run on shafts, etc., that is to say on shaft sealing surfaces. The largest diameter $d_I$ between the sealing edges at the narrowest orifice of the sealing lip of seals of the prior art which is not mounted on the shaft sealing surfaces in an initial state is therefore smaller than the smallest possible diameter $D_A$ of the shaft sealing surface on which the respective sealing lip runs. When the seal is being mounted on the shaft, the orifice of the sealing lip widens elastically to the diameter $D_A$ of the sealing surface and bears with prestress against the sealing surface.

The prestress with which a sealing lip bears against the sealing surface is dependent on the oversize which $D_A$ has with respect to $d_I$. This oversize depends on the total tolerance. Further, the prestress is dependent on the type of material and on the design of the sealing lip. A thick-walled sealing lip will bear with more prestress than a comparatively thin-walled sealing lip of the same diameter, since, during widening, more material is positively deformed elastically and displaced. However, limits are placed on the thin-walledness of sealing lips for strength reasons. The prestress is therefore also dependent on the quantity of material displaced during the widening of the sealing lip to $D_A$. Excessive prestress leads to increased frictional resistance, temperature generation and inadmissible wear.

If $d_I$ of the angled sealing lip in the nonmounted initial state is smaller than $D_A$, when the shaft is being mounted in the sealing orifice, this sealing lip will be overturned out of an axial direction without the use of a mounting aid. When a generic seal is being mounted, a mounting aid is necessary for a sealing fit on a common sealing surface on account of the two sealing lips angled in opposite directions to one another.

With one refinement of the invention, therefore, there is provision for one of the two sealing lips, preferably the first sealing lip, to bear sealingly, radially prestressed elastically, at the sealing contact and, in a nonmounted and not elastically prestressed initial state, to have a largest possible orifice diameter $d_{I-1}$, which is smaller than a smallest possible outside diameter $D_{A-1}$ of a first sealing surface in sealing contact with the one sealing lip. The other sealing lip, preferably the second sealing lip, in the mounted state, bears at least radially at the sealing contact and nevertheless in this case has, in the initial state, a smallest orifice diameter $d_{I-2}$ which is larger than a largest possible outside diameter $D_{A-2}$ of a second sealing surface in sealing contact with the other of the sealing lips. $D_{A-1}$ is, as a rule, equal to $D_{A-2}$.

During the mounting of the shaft or the like, the shaft can first be led through the orifice $d_{I-2}$ contactlessly or at least without prestress and then widens the sealing lip to the orifice diameter $d_{I-1}$. Since both sealing lips have a common base, the material displaced with the widening of the one sealing lip and/or the deflecting movement of the base causes a contraction of $d_{I-2}$, so that $d_{I-2}$ is at least equal to $D_{A-2}$. The use of mounting aids is no longer necessary. The prestress in the seal and therefore the friction in the frictional contact are reduced, since the material displaced elastically during the widening of the orifice diameter of the first sealing lip reduces at least partially the orifice diameter of the second sealing lip and thus exerts less elastic prestress on the first sealing lip.

BRIEF DESCRIPTION OF THE DRAWINGS

The present invention may be better understood and appreciated by reading the following detailed description in conjunction with the accompanying drawings, in which:

FIG. 1 illustrates a wheel mounting in a longitudinal section;

FIG. 2 illustrates a side view of the seal;

FIG. 3 illustrates detail X of FIG. 1;

DESCRIPTION OF THE DRAWINGS

Figure 4:
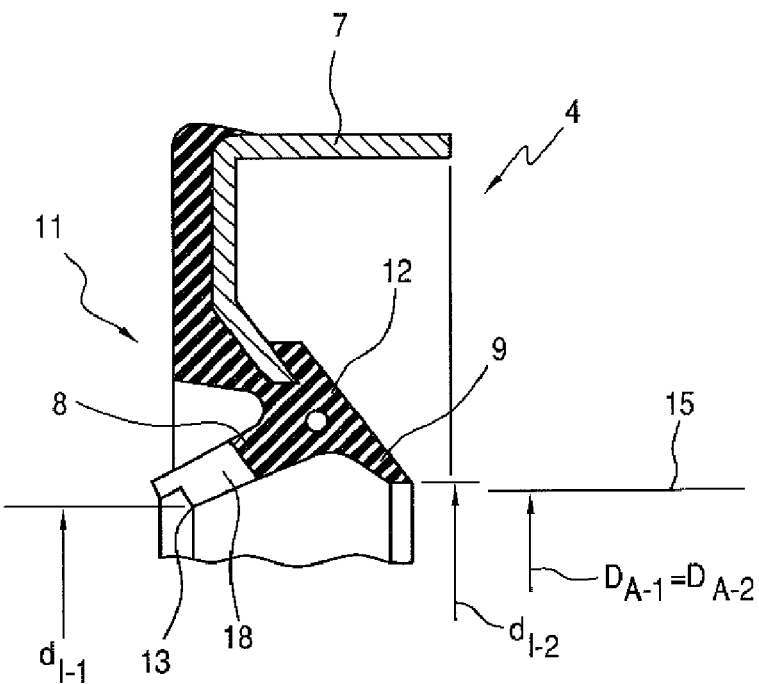
FIG. 4 illustrates a longitudinal section of the seal along line IV-IV.

The invention is explained in more detail below with reference to an exemplary embodiment. FIG. 1 shows a wheel mounting 1 in a longitudinal section along the axis of rotation 1a, partially illustrated. The wheel mounting 1 has two bearings 2, a cartridge seal 3 and an exemplary embodiment of the seal 4 according to the invention. The bearings 2 are seated in a housing 5.

Figure 5:
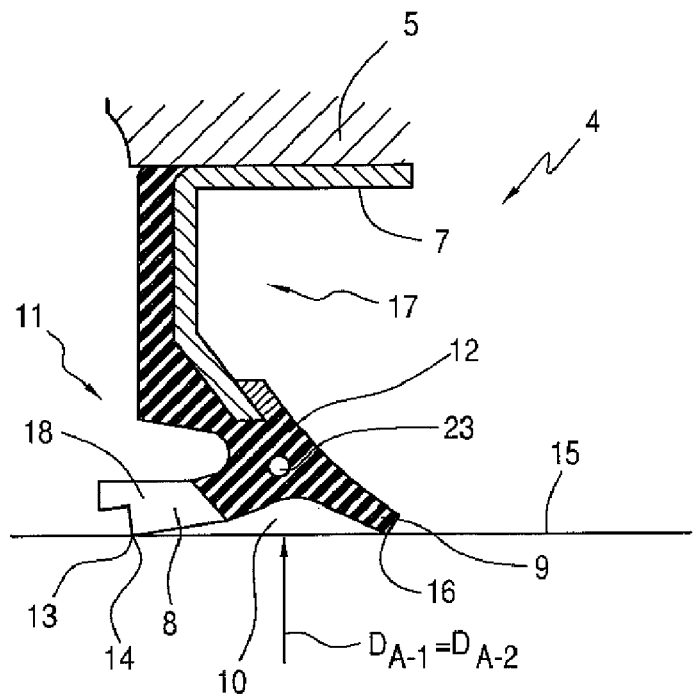
FIG. 5 illustrates detail Y of FIG. 1.

The seal 4 sits in the housing 5 on a side of the wheel mounting 1 which is subjected to less load due to dirt, and seals off with respect to an inner ring 6 of one bearing 2. In FIG. 2, the seal 4, in an initial state, is not mounted in the housing and is illustrated, not true to scale, in an overall view. FIG. 4 shows a longitudinal section through the seal 4 along the line IV-IV from FIG. 2. FIG. 5 shows the detail Y according to FIG. 1, enlarged and not true to scale.

The seal 4 consists of a reinforcement 7 and of a (first) sealing lip 8 and a (second) sealing lip 9. The sealing lip 8 is angled from a base 12 on the reinforcement 7 outward away from the bearing 2 and extends from the base 12 as far as a sealing edge 13 at the sealing contact 14 with the sealing surface 15 on the outer circumference of the inner ring 6. The sealing lip 8 closes off a prechamber 10 with respect to the external surroundings 11 of the wheel mounting 1 and blocks against the penetrating of dirt and water from the external surroundings 11 into the prechamber 10.

The sealing lip 9 is angled from the reinforcement 7 or from the base 12 inward toward the bearing 2 and extends from the base 12, common to the sealing lip 8, up to a sealing contact 16 on the sealing surface 15 and in this case runs away from the base 12 between the prechamber 10 and the bearing interior 17.

The sealing lip 8 has a ventilation orifice 18 leading from the external surroundings 11 into the prechamber 10. The ventilation orifice 18 is a recess at the sealing edge 13.

The sealing edge 13 is in sealing contact 14 with the inner ring 6 at the sealing surface 15. The recess is open to the sealing surface 15 of the component and is therefore not delimited in this direction by the material of the sealing lip 8. As a result, the sealing lip 8, otherwise bearing sealingly in a circumferentially continuous manner about the axis of rotation 1a, is partially interrupted once at the sealing edge 13 of the sealing contact 14, via the ventilation orifice 18 in the circumferential direction about the axis of rotation 1a.

The sealing lip 8 bears sealingly, radially prestressed elastically, at sealing contact 14. For this purpose, in a non-mounted and not elastically prestressed initial state illustrated in FIG. 4, the sealing lip 8 has a largest possible orifice diameter $d_{I-1}$. $d_{I-1}$ is smaller than the smallest possible outside diameter $D_{A-1}$ of the sealing surface 15 in sealing contact 14 with the sealing lip 8. The sealing lip 9, in the mounted state, bears at least radially at sealing contact 16 and has in the initial state a smallest orifice diameter $d_{I-2}$ which is larger than the largest possible outside diameter $D_{A-1}$ of the sealing surface 15 in sealing contact 16 with the sealing lip 9. When the sealing lips 8 and 9 bear sealingly against the inner ring 6, the orifice diameter of the sealing lip 8 is widened to $D_{A-1}$ and the orifice diameter of the sealing lip 9 is reduced to $D_{A-1}$. As seen in longitudinal section, the seal 4 tilts about an imaginary tilting axis 23, running through the base 12 and annularly about the axis of rotation 1a, with the second sealing lip 9 going in the direction of the sealing surface 15.

The cartridge seal 3 (FIG. 3) has three sealing lips 20, 21, 22 which are angled from a carrier 19 and which block the bearing interior 17 against environmental influences from outside coming from the external surroundings 11. The sealing lip 9 blocks against the emergence of grease from the bearing interior 17 and consequently also against overpressure in the bearing interior 17. The overpressure in the bearing interior 17 is compensated via the sealing lips 20, 21 and 22 of the cartridge seal 3. Underpressure in the bearing interior 17 is compensated via the sealing lip 9. Underpressure in the prechamber 10 cannot arise because of the ventilation orifice 18, so that, when underpressure in the bearing interior 17 is compensated by the sealing lip 9 via the prechamber 10, pressure compensation in the prechamber 10 with respect to the external surroundings 11 is ensured via the ventilation orifice 18.

The invention claimed is:

1. A seal rotatable about an axis of rotation for sealing an annular space between a housing and an inner ring such that an interior of the bearing is sealed off from external surroundings, the seal comprising:

a reinforcement having a first leg with a first end, a second end, an outer surface and an inner surface extending parallel to the axis of rotation, a second leg having a first end, a second end, an outer face and an inner face extending radially inward from the second end of the first leg, toward the axis of rotation from the first leg, and a third leg having a first end, a second end, an outer face and an inner face angled radially inwardly and extending toward the axis of rotation from the second end of the second leg;

a seal body having a base, a segment extending radially outward from the base, toward the first leg and encompassing the outer face of the second leg and the third leg, a first sealing lip with an inner diameter angled outward from the base, away from the first end of the first leg of the reinforcement, toward the external surroundings, having a first sealing edge contactable with a sealing surface forming a first sealing contact, and a second sealing lip with an inner diameter angled inward from the base, toward the first end of the first leg of the reinforcement and the interior of the bearing at an acute angle, and contactable with the sealing surface forming a second sealing contact, an annular prechamber is formed between the first sealing lip and the second sealing lip, only the first sealing lip having at least one ventilation orifice at the first sealing edge, leading from the external surroundings of the seal into the prechamber, the ventilation orifice interrupting the first sealing edge, such that the first sealing lip, at the first sealing edge, seals in a circumferentially continuous manner about the axis of rotation with the seal is interrupted once, by the ventilation orifice, and the seal being pivotable between a first position and a second position, in the first position, the inner diameter of the first sealing lip is smaller than the inner diameter of the second sealing lip and in the second position, the inner diameter of the first sealing lip is increased and the inner diameter of the second sealing lip is decreased.

2. The seal as claimed in claim 1, wherein the first sealing lip bears sealingly, radially prestressed elastically, at the first sealing contact and, in a non-elastically prestressed initial state, has an orifice diameter which is smaller than an outside diameter of the first sealing surface, and the second sealing lip, in an initial state, has an orifice diameter which is larger than the outside diameter of the second sealing surface.

3. A wheel bearing unit comprising a seal as claimed in claim 1, with a cartridge seal lying axially opposite the seal in the bearing interior, the cartridge seal having at least two sealing lips directed axially outward in an opposite direction to the first sealing lip.

* * * * *